Patented Aug. 18, 1925.

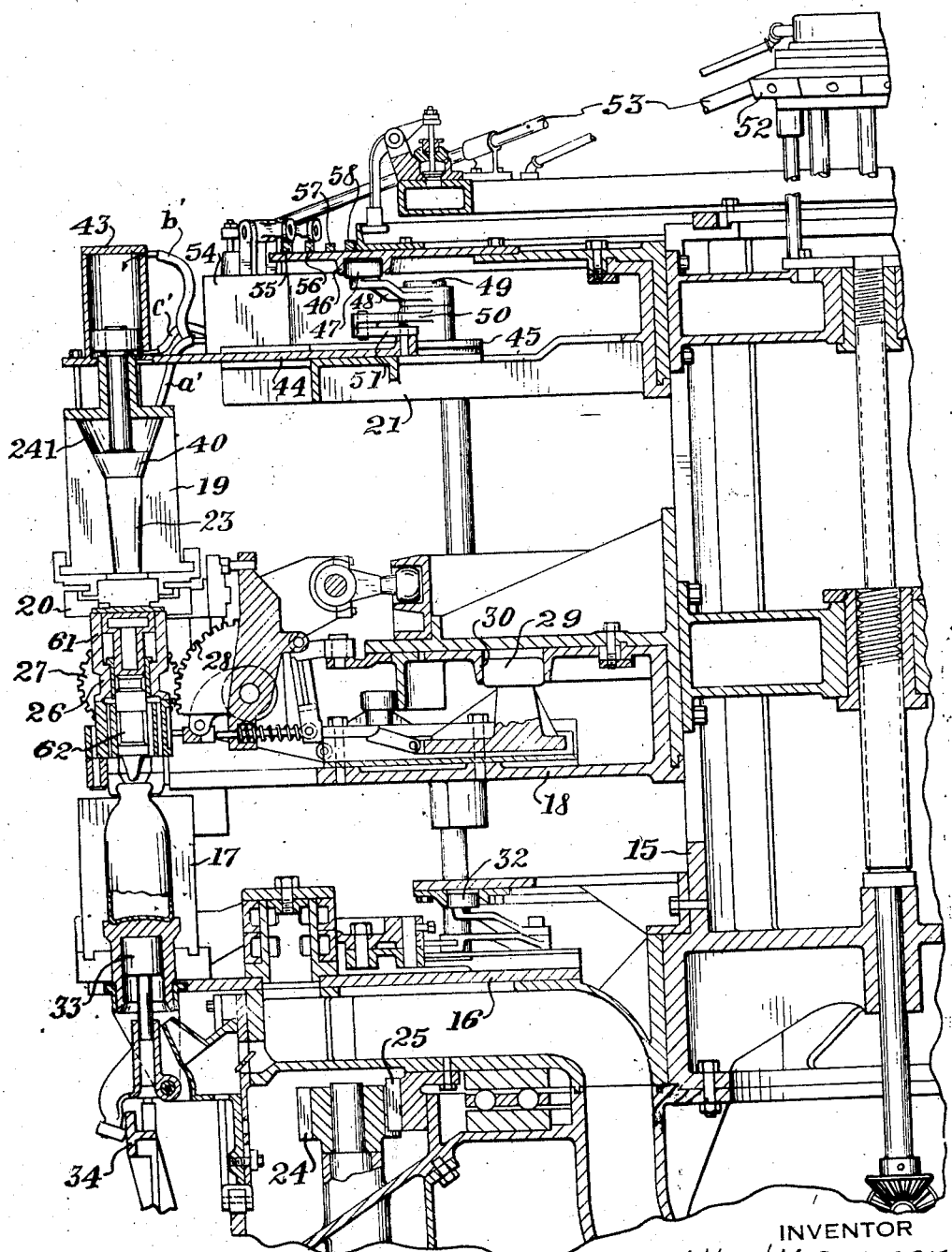

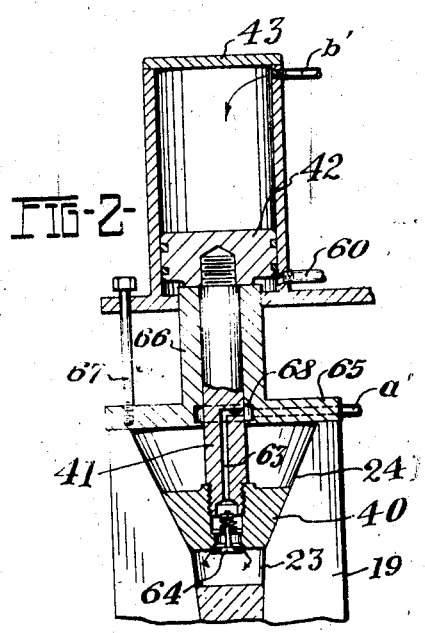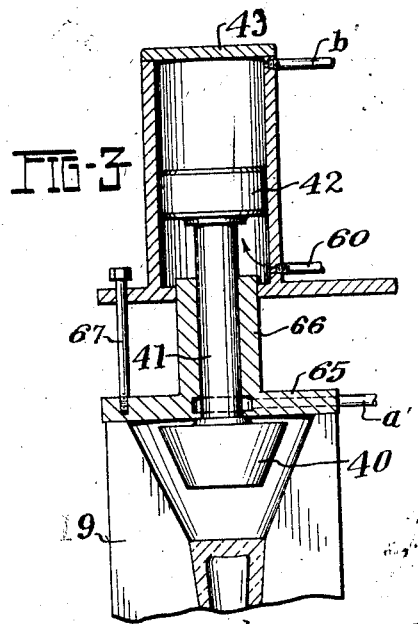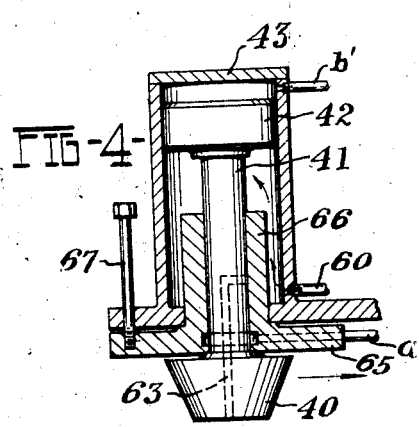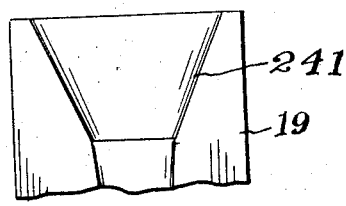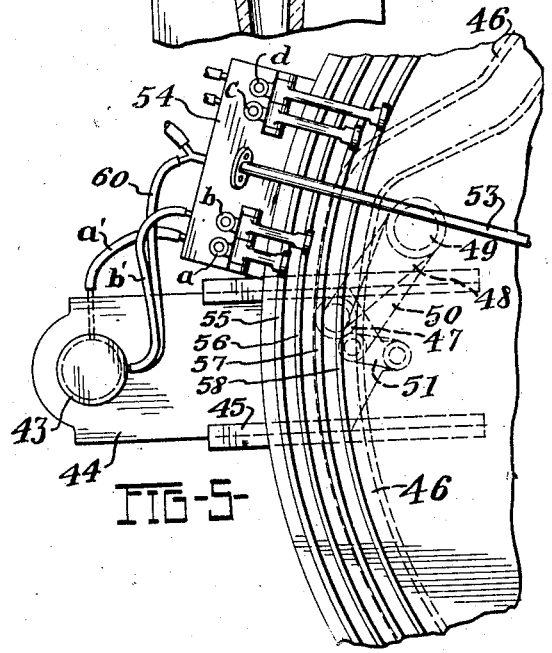

1,550,346

UNITED STATES PATENT OFFICE.

ALBERT N. CRAMER, OF TOLEDO, OHIO, ASSIGNOR TO THE OWENS BOTTLE COMPANY, OF TOLEDO, OHIO, A CORPORATION OF OHIO.

GLASS-FORMING MACHINE.

Application filed April 30, 1923. Serial No. 635,573.

*To all whom it may concern:*

Be it known that I, ALBERT N. CRAMER, a citizen of the United States, residing at Toledo, in the county of Lucas and State of Ohio, have invented new and useful Improvements in Glass-Forming Machines, of which the following is a specification.

My invention relates to glass forming apparatus and particularly to gravity fed glass forming machines. It is customary to feed machines of this type by dropping the charges of glass into the open upper ends of inverted blank molds. When the charges are supplied by automatic feeders, particularly where the mold carriage rotates continuously, means such as funnel shaped guides, are ordinarily provided to guide the charges of glass into the molds as the latter pass the charging station. After a charge is received in the mold, a blow head is brought into position over the receiving end of the mold and air under pressure is supplied through said head for compacting and shaping the glass in the mold. The blow head may also serve as a forming plate or mold bottom when the parison is blown to hollow form by air supplied through the opposite end of the mold.

When individual blow heads mounted on the mold carriage are provided for the blank molds, as has been found desirable with continuously rotating machines,—it has been the practice to withdraw each funnel guide after a charge has entered the mold, to permit the corresponding blow head to be positioned on the mold.

An object of the present invention is to provide a combined mold and guide which will permit the charges of glass to be directed into the mold as the latter passes the charging station, without the necessity of separate guiding means.

A further object of the invention is to provide a mold closing head, or a combined mold closing and blowing head adapted to cooperate with said combined mold and guide.

Other objects of the invention will appear hereinafter.

In the accompanying drawings:

Figure 1 is a sectional elevation of a glass blowing machine to which my invention is applied, parts being broken away.

Figure 2 is a sectional detail view showing a combined blank mold and guide, and a blowing head and its operating motor, said head being in its operative position.

Figure 3 is a similar view with the blowing head partially withdrawn.

Figure 4 is a view showing the blow head withdrawn and moving laterally away from its position over the mold.

Figure 5 is a fragmentary top plan view of a portion of the machine.

The present application discloses certain features of novelty also disclosed in my co-pending application, glass molding apparatus, Serial Number 431,070, filed December 16, 1920.

The invention is herein shown as applied to a glass blowing machine such as disclosed in the co-pending application of Richard La France, glass blowing machines, Serial Number 532,606, filed January 30, 1922. It will be understood, however, that the invention is adapted for use with various other types of machines.

Referring particularly to Figure 1, the machine comprises a central stationary column 15 on which the mold carriage is mounted for continuous rotation. The carriage comprises a lower section or table 16 on which are supported the finishing molds 17, an intermediate section 18 which carries the blank molds 19 and neck molds 20, and an upper section 21 on which the mold closing heads 40 are supported. The carriage is rotated continuously by means of a driving pinion 24 running in mesh with an annular gear 25 on the carriage.

The blank molds 19 are arranged in an annular series on the mold carriage, each mold comprising horizontally separable sections. Each mold is in the inverted position shown in Figure 1 when it reaches the charging station, with its upper end open to receive the charge of glass. At this time, the neck mold 20 is directly beneath and in register with the blank mold. After a charge has been dropped into the blank mold, a blowing head is brought into position to close the upper end of the mold, and air is supplied in the manner hereinafter set forth, to compact the glass in the mold.

A head 26 carrying the blank mold and neck mold is then rotated about a horizontal axis to swing the blank mold and neck mold as a unit downward. This movement is effected by means of a pinion 27 driven by a gear segment 28 having an operating connection with a cam roll 29 running on a stationary cam track 30. After the blank mold has been swung downward, it is opened and reinverted, leaving the blank suspended from the neck mold. The finishing mold sections are now closed around the blank, said sections being actuated by a cam 32, after which the blank is blown to its final form. After the bottle has been blown, the finishing mold opens and the mold bottom 33 is tilted to discharge the bottle, said bottom being controlled by a stationary cam 34.

The charges of molten glass are preferably supplied by an automatic feeder which may comprise the usual furnace boot or forehearth having an outlet opening in the bottom thereof through which the glass issues.

As the blank molds 19 are traveling continuously and at a considerable speed, they are only directly beneath the feeder outlet for a brief interval of time, so that in practice it is found necessary to provide guiding means to insure the glass being properly guided into the mold. For this purpose, I have provided guides integral with the molds. That is to say, the molds are extended some distance above the upper ends of the mold cavities 23 to provide inclined or flared guiding walls 241. These walls provide a funnel shaped guide integral with and forming an extension of the mold proper.

Associated with each blank mold is a blowing head 40 which is brought into position to close the upper end of the mold after a charge of glass has been introduced therein. Each blowing head is connected to the lower end of a piston rod 41, to the upper end of which is attached the piston 42 of an air motor 43. Said motor is carried by a plate 44 mounted to slide radially of the machine in guides 45 on the upper section 21 of the mold carriage. The slide plate 44 is actuated by a cam 46, on which runs a cam roll 47 carried by a rock arm 48 mounted to rock about the axis of a pivot pin 49. A rock arm 50 connected to rock with the arm 48, is connected through a link 51 to the slide plate 44. The cam is so shaped that after a charge has been dropped into the blank mold, the slide 44 is projected to bring the blow head into a position directly over the mold. Air is then supplied to the motor 43 for lowering the blow head to mold closing position.

The means for controlling the supply of air to the motor will now be described. A constant supply of air under pressure is maintained within a head or drum 52 from which extend radial pipes 53 opening at their outer ends into air distributing boxes 54 (Fig. 1). Each box 54 contains valves $a$, $b$, $c$, $d$, actuated by cams 55, 56, 57, 58, respectively. The valve $a$ when opened supplies air through a pipe $a'$ to the blow head 40. The valve $b$ controls the air supply through a pipe $b'$ to the motor 43 above its piston. The pipe 60 leads from the box 54 to the motor 43 at a point below the piston and is open constantly to the air pressure within the box 54. The valve $c$ controls the air supply for a motor 61 (Fig. 1) which operates a plunger 62 for forming the initial blow opening in the blank. The valve $d$ controls the supply of air for blowing the blank to hollow form.

After the blow head has been projected to its position directly over the mold, as above noted, the valve $b$ is opened by its cam 56 and admits air pressure to the motor 43 above its piston, so that the blow head is lowered onto the mold, as shown in Figures 1 and 2. The valve $a$ is then opened by its cam and supplies air through the pipe $a'$ and a conduit 63 (see Fig. 2) in the stem 41, thereby opening a poppet valve 64 in the blow head 40, and supplying air under pressure within the blank mold. The air pressure compacts the glass in the mold and forms the neck end of the bottle. The valve $b$ is then closed, so that air under pressure through the pipe 60 lifts the blow head away from the mold.

In order to arrest the downward movement of the blow head 40 when it seats in the mold 19 and thereby prevent said head from spreading the mold sections, the following means are provided: A stop plate 65 formed with a hollow stem or bearing sleeve 66 is slidably mounted on the piston rod 41. While the blow head is in its uppermost position (Fig. 4) the sleeve 66 projects upward within the motor cylinder. When air pressure is admitted above the motor piston, the blow head moves downward and the plate 65 is carried downward with it until it seats on the upper end of the mold 19. The blow head continues its downward movement until it is seated within the mold and the piston 42 seats on the upper end of the sleeve 66 which forms a positive stop to limit the downward movement of the blow head. The latter is thereby prevented from spreading the mold sections.

When air is supplied through the pipe 60 for lifting the blow head, it is moved upward to the intermediate position shown in Figure 3 before the stop plate 65 is lifted. Said plate and blow head then move upward together until the blow head is above the mold. The provision of a telescoping connection between the piston rod 41 and the sleeve 66 whereby the blow head is movable relatively to the stop plate 65, permits a compact arrangement of the parts and enables the air motors 43 to be brought down comparatively close to the blank molds. A guiding rod 67 attached to the plate 65 prevents rotation of the latter relative to the mold. The pipe a' supplying air pressure to the blow head is connected with a port 68 in the plate 65, which port is open to the channel 63 only when the blow head is seated on the mold. As soon as the blow head is lifted from the mold, the air supply is cut off at this port.

Modifications may be resorted to within the spirit and scope of my invention.

What I claim is:

1. In a glass forming machine, the combination of a mold carriage, means to rotate it about a vertical axis, a mold on said carriage open at its upper end to receive a charge of glass, guiding means having a fixed relation to the mold and comprising an inclined guiding surface extending upwardly from the mold cavity, a mold closing head, a motor for actuating said head, said motor and head being mounted on the carriage to travel therewith, automatic means controlled by the movement of the mold carriage for shifting said head and motor radially on the carriage into and out of a position over the mold, and means for actuating said motor and thereby moving the said head downward into engagement with the said guiding surface and thereby closing the mold.

2. In a glass forming machine, the combination of a mold carriage, means to rotate it about a vertical axis, a mold on said carriage open at its upper end to receive a charge of glass, guiding means having a fixed relation to the mold and comprising an inclined guiding surface extending upwardly from the mold cavity, a mold closing head, a motor for actuating said head, said motor and head being mounted on the carriage to travel therewith, a slide plate carrying said motor and head, means for moving said plate radially of the machine and thereby shifting said motor and head into and out of a position directly over the mold, and means for actuating the motor for moving the said head into and out of engagement with said guiding surface.

3. In a glass forming machine, the combination of a split mold, a mold closing head, a motor for moving said head to mold closing position between the mold sections, a stop plate movable relatively to said head and arranged to seat on the mold and limit the movement of said head in a mold closing direction, said stop plate and head having air channels brought into communication by said relative movement, and means to supply air through said channels to the mold.

4. In a glass forming machine, the combination of a split mold, a head adapted to enter one end of the mold, a stop plate, and a piston motor, said head connected to the motor piston, the stop plate having a lost motion connection with the motor piston, said plate arranged to seat on the mold and arrest the mold closing movement of said head.

5. In a glass forming machine, the combination of a continuously rotating mold carriage, blank molds thereon open at their upper ends to receive charges of glass, said molds being extended upwardly above the mold cavities and formed with upwardly and outwardly flared surfaces for guiding the glass into the molds, piston motors individual to said molds, slide plates mounted on the mold carriage and carrying said motors, blow heads connected to the motor pistons, stop plates having a slidable connection with the motor pistons, means for moving said slide plates radially of the machine and thereby bringing the said motors and heads to positions directly over the molds, and means for actuating each motor and thereby projecting the connected head downward to mold closing position and seating the stop plate on the mold, whereby said stop plate serves as a stop to limit the downward movement of said head and prevents it from spreading the mold sections apart.

6. In a glass forming machine, the combination of a split mold, a piston motor, a blowing head connected to the motor piston and adapted to enter one end of the mold, and a stop plate having a lost motion connection with the motor piston, said plate arranged to seat on the mold and arrest the mold closing movement of said head, said plate and piston having air channels brought into register when the head is in mold closing position for supplying air under pressure to the mold.

7. In a glass forming machine, the combination of a mold, a blowing head movable to and from the mold, and a stop plate movable with the blowing head to a stop position as said head moves toward the mold, permitting the final movement of said head independently of the stop plate, said plate having an air channel therethrough brought into communication with the blow head during said final movement of the latter for supplying air through the blow head to the mold.

8. In a glass forming machine, the combination of a mold, a blowing head movable into engagement with the mold, a stop plate movable relatively to said head and arranged to limit the movement of said head, and means for supplying air under pressure to said head, said supply being controlled by the relative movement of the stop plate and said head.

Signed at Toledo, in the county of Lucas and State of Ohio, this 25th day of April, 1923.

ALBERT N. CRAMER.